(12) United States Patent
Moriya

(10) Patent No.: US 7,877,006 B2
(45) Date of Patent: Jan. 25, 2011

(54) FOCUS INFORMATION DISPLAY SYSTEM

(75) Inventor: Chikatsu Moriya, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 740 days.

(21) Appl. No.: 11/714,256

(22) Filed: Mar. 6, 2007

(65) Prior Publication Data
US 2007/0212051 A1   Sep. 13, 2007

(30) Foreign Application Priority Data
Mar. 13, 2006   (JP)   ............................. 2006-067789

(51) Int. Cl.
   G03B 13/30   (2006.01)
   G03B 17/18   (2006.01)
   G03B 13/24   (2006.01)
   H04N 5/232   (2006.01)
   G02B 7/04    (2006.01)

(52) U.S. Cl. .................... 396/147; 396/79; 396/124; 396/125; 396/150; 348/346; 348/353; 250/201.7

(58) Field of Classification Search ................. 396/147, 396/79–82, 124, 125, 150; 348/345, 346, 348/353; 250/201.2, 201.7
See application file for complete search history.

(56) References Cited

U.S. PATENT DOCUMENTS 4,641,942 A   2/1987   Sakai et al.
5,629,735 A * 5/1997   Kaneda et al. .............. 348/350
2004/0130652 A1   7/2004   Sasaki et al.
2005/0110890 A1* 5/2005   Sasaki et al. ................ 348/345

FOREIGN PATENT DOCUMENTS

| EP | 1637912 A2 | 3/2006 |
| EP | 1638319 A1 | 3/2006 |
| JP | 2002-365710 A | 12/2002 |
| JP | 2004-212458 A | 7/2004 |
| WO | WO-02/099495 A1 | 12/2002 |

* cited by examiner

Primary Examiner—Rochelle-Ann J Blackman
(74) Attorney, Agent, or Firm—Birch, Stewart, Kolasch & Birch, LLP

(57) ABSTRACT

A focus information display system is provided in which focus state detection that is performed during automatic focusing (AF) and the like is also performed during manual focusing (MF) and the like to display focus information indicating a focus state. By arranging a focus position range at which a correct focus state is determined when a correct focus display is being performed to be wider than a focus position range at which a correct focus state is determined when an out-of-focus display is being performed, stabilization of a state of correct focus display is achieved without jeopardizing correct focusing accuracy when performing focusing according to a focus information display.

18 Claims, 9 Drawing Sheets

FOCUS INFORMATION DISPLAY SYSTEM

BACKGROUND OF THE INVENTION

1. Field of the Invention

The present invention relates to a focus information display system, and more particularly, to a focus information display system that displays focus information indicating a focus state of whether a correct focus state exists based on a focus evaluation value indicating a contrast intensity of a subject image formed by an optical system.

2. Description of the Related Art

Contrast method automatic focusing (AF) is generally known as an AF function that is adopted in broadcast television cameras. With contrast method AF, signals of high frequency components are extracted from visual image signals obtained via a camera, and a focus evaluation value that evaluates contrast intensity is obtained based on the extracted signals. The focusing of the photographing lens (focusing lens group) is controlled using, for instance, a method referred to as the hill-climbing method so that a peak (maximum) focus evaluation value is obtained.

Additionally, in contrast method AF, an operation referred to as wobbling is performed in which focusing is subjected to minute fluctuations. By performing focus evaluation value detection while wobbling is in progress, for instance, focus evaluation values at front and rear positions of a current focus position may be detected. Based on the magnitude relation of the focus evaluation values of the front and rear positions, detection is performed on whether the focus evaluation value at the current position is a peak value, or otherwise a direction in which the focus evaluation value will reach its peak value is detected. The focus is moved to a correct focus position at which a peak focus evaluation value is achieved by controlling focusing while sequentially detecting peak focus evaluation values caused by wobbling.

Furthermore, when performing wobbling as described above, there are problems in that focus fluctuation due to wobbling are recognized on screen, or accurate focusing on subjects moving at high-speed is difficult. In this light, an optical path length difference method AF, such as that presented in Japanese Patent Application Laid-Open No. 2004-212458, is proposed. According to Japanese Patent Application Laid-Open No. 2004-212458, an optical path of a photographing lens (optical system) that forms a subject image is split into two optical paths by a light splitting device such as a half mirror or the like. Subject light that is guided to one of the optical paths forms a subject image on an image capturing surface of an image capturing element (visual image capturing element) of a camera main body that is arranged to capture images (visual images) for purposes of recording or playback. Subject light that is guided to the other optical path forms a subject image on an image capturing surface of an image capturing element (AF image capturing element) that is arranged to capture AF images (visual images).

The image capturing surface of the AF image capturing element is comprised of, for instance, two image capturing surfaces with optical path lengths arranged at different positions using two image capturing elements. Subject light that is diverged to the AF optical path is further split to incident to respective image capturing surfaces of the AF image capturing elements. The image (subject image) captured by each image capturing surface of the AF image capturing element corresponds to an image captured by the image capturing surface of the visual image capturing element when focus is displaced from a current position by a given amount. A focus state (correct focus, front focus, rear focus) at the current position of the focus in relation to an image capturing surface of the visual image capturing element is therefore arranged to be detectable by obtaining a focus evaluation value from each image captured by the respective image capturing surfaces of the AF image capturing elements and comparing the obtained focus evaluation values.

Thus, since there is no need to perform wobbling, focus may be moved to a correct focus position without creating focus fluctuation attributable to wobbling. In addition, prompt focusing may be achieved, and accurate focusing may even be performed on subjects moving at high speeds.

Furthermore, an invention proposed in Japanese Patent Application Laid-Open No. 2002-365710 is arranged so that focus state detection performed under AF, as described above, is also performed during manual focusing (MF), and focus information indicating a current focus state is displayed on a view finder of a camera or a display unit of a focusing section or the like. According to Japanese Patent Application Laid-Open No. 2002-365710, by performing focusing using the focus information as reference, a photographer may easily determine, not only from images on the view finder, whether a subject is in focus or otherwise determine a focusing direction when not in focus.

SUMMARY OF THE INVENTION

However, with conventional focus information display methods, even in a case in which focusing is set so that focus information display becomes a correct focus display indicating a correct focus state, since focus evaluation values indicating whether a correct focus state exists fluctuate due to noise and the like, there was a problem in that the display state frequently alternates between a correct focus display state and an out-of-focus display state indicating an out-of-focus state such as front focus or rear focus. In addition, in circumstances in which display states are unstable, there is a problem in that setting focus to a correct focus state by referring to the focus information display is difficult. Therefore, while the display state may be stabilized by relaxing a condition in which a correct focus state is determined and a correct focus display is performed, a focus range in which correct focus is displayed will also be expanded, resulting in a flaw in which correct focusing accuracy when performing focusing according to the correct focus display will be reduced.

The present invention has been made in light of the above circumstances, and an object thereof is to provide a focus information display system that is capable of stabilizing a correct focus display state without jeopardizing correct focusing accuracy when performing focusing according to a focus information display.

In order to achieve the above object, a focus information display system according to a first aspect of the present invention comprises: a focus state display device that displays whether a focus state of an optical system that forms an subject image is a correct focus state or an out-of-focus state; a first correct focus determination device that determines, in the event that an out-of-focus display indicating an out-of-focus state is performed by the focus state display device, whether a focus state of the optical system is a correct focus state or an out-of-focus state; a second correct focus determination device that determines, in the event that a correct focus display indicating a correct focus state is performed by the focus state display device, whether a focus state of the optical system is a correct focus state or an out-of-focus state, wherein a determination of a correct focus state is made in a focus position range that is wider than the focus position range in which the first correct focus determination device determines a correct focus state; and a display switching device that switches the focus state display device to a correct focus display when the first correct focus determination device determines a correct focus state in the event that an out-of-focus display is performed by the focus state display device, and switches the focus state display device to an out-of-focus display when the second correct focus determination device determines an out-of-focus state in the event that a correct focus display is performed by the focus state display device.

According to the present invention, since a focus position range in which a correct focus state is determined during correct focus display is larger than a focus position range in which a correct focus state is determined during out-of-focus display, once a correct focus display is performed, it is now more unlikely that the display will switch to an out-of-focus display. As a result, a stable correct focus display is achieved. In addition, since a condition in which an out-of-focus display switches over to a correct focus display may be set to demand highly-accurate focusing regardless of the stability of the correct focus display, degradation of correct focusing accuracy when performing focusing according to a focus information display may be avoided even when attempting stabilization of a correct focus display state.

A focus information display system according to a second aspect of the present invention is the focus information display system according to the first aspect, further comprising a focus evaluation value detection device that detects a focus evaluation value indicating a contrast intensity of a subject image formed by the optical system, wherein the first correct focus determination device acquires focus evaluation values from at least two focus positions of the optical system via the focus evaluation value detection device, and determines a correct focus state when the magnitude of the difference between the two acquired focus evaluation values is below a predetermined threshold. The present invention represents a mode of a case in which a focus evaluation value indicating a contrast intensity of a subject image is used for the determination (by the first correct focus determination device) of a correct focus state in the event that an out-of-focus display is performed.

A focus information display system according to a third aspect of the present invention is the focus information display system according to the second aspect, wherein the focus evaluation value detection device detects focus evaluation values of at least two focus positions of the optical system by detecting focus evaluation values of a subject image captured by at least two image capturing surfaces positioned so that optical path lengths thereof differ from one another. The present invention is an application of focus evaluation value detection, which is used in automatic focusing according to the so-called optical path length difference method, to the present system.

A focus information display system according to a fourth aspect of the present invention is the focus information display system according to the second or third aspect, wherein the second correct focus determination device acquires focus evaluation values of at least two focus positions of the optical system via the focus evaluation value detection device, and determines a correct focus state when the magnitude of the difference between the two acquired focus evaluation values is below a threshold having a greater value than the threshold used by the first correct focus determination device. The present invention represents a mode of a case in which focus evaluation values are used in the same manner as the first correct focus determination device for the determination (by the second correct focus determination device) of a correct focus state in the event that a correct focus display is performed. In this case, since the condition that the second correct focus determination device uses to determine a correct focus state is more relaxed than that used by the first correct focus determination device, it is now more unlikely that the display will switch to an out-of-focus display, and a stable correct focus display state is achieved.

A focus information display system according to a fifth aspect of the present invention is the focus information display system according to any of the first, second, third or fourth aspect, wherein the second correct focus determination device further comprises a depth of field calculation device that calculates a depth of field at a focus position at which a correct focus state is determined by the first correct focus determination device, and a correct focus state is determined when the focus position of the optical system is within a depth of field range calculated by the depth of field calculation device. The present invention represents a mode of a case in which a depth of field is used for the determination (by the second correct focus determination device) of a correct focus state in the event that a correct focus display is performed. When using a depth of field range, since a case in which the focus position changes and an out-of-focus state is determined by the first correct focus determination device will now be determined to be a correct focus state, a stable correct focus display may be achieved.

A focus information display system according to a sixth aspect of the present invention is the focus information display system according to the fifth aspect, wherein the second correct focus determination device acquires focus evaluation values of at least two focus positions of the optical system via the focus evaluation value detection device, and determines a correct focus state when the magnitude of the difference between the two acquired focus evaluation values is below a threshold having a greater value than the threshold used by the first correct focus determination device, and at the same time the focus position of the optical system is within the depth of field range calculated by the depth of field calculation device. The present invention takes into consideration cases in which the focus position may deviate significantly from a correct focus state due to a change in the subject position even in the event that the focus position is within an original depth of field range in which a correct focus state has been determined when a correct focus display is performed as according to the fifth aspect.

A focus information display system according to a seventh aspect of the present invention is the focus information display system according to the fifth or sixth aspect, wherein the depth of field calculation device re-calculates a depth of field in the event that at least one of a focal length or an aperture value of the optical system changes. The present invention takes into consideration the possibility that the depth of field may change depending on the configuration state of the optical system, and arranges determination to be performed by the second correct focus determination device on whether a correct focus state exists in the event that a correct focus display is performed.

A focus information display system according to an eighth aspect of the present invention is the focus information display system according to any one of the first to seventh aspects, further comprising a determination switching device that switches, based on an operation of a predetermined switch, the determination by the second correct focus determination device on whether the state is a correct focus state or an out-of-focus state to a determination that is similar to that performed by the first correct focus determination device.

The present invention enables determination by the second correct focus determination device on whether the state is a correct focus state or an out-of-focus state to be performed using the same determination as performed by the first correct focus determination device in cases such as when performing tracking adjustment of the optical system in which determination and display of whether a correct focus state exists are desirably performed by both the first correct focus determination device and the second correct focus determination device.

The focus information display system according to the present invention thereby enables stabilization of a correct focus display state without jeopardizing correct focusing accuracy when performing focusing according to a focus information display.

DETAILED DESCRIPTION OF THE PREFERRED EMBODIMENTS

A preferred embodiment of a focus information display system according to the present invention will be described with reference to the accompanying drawings.

Figure 1:
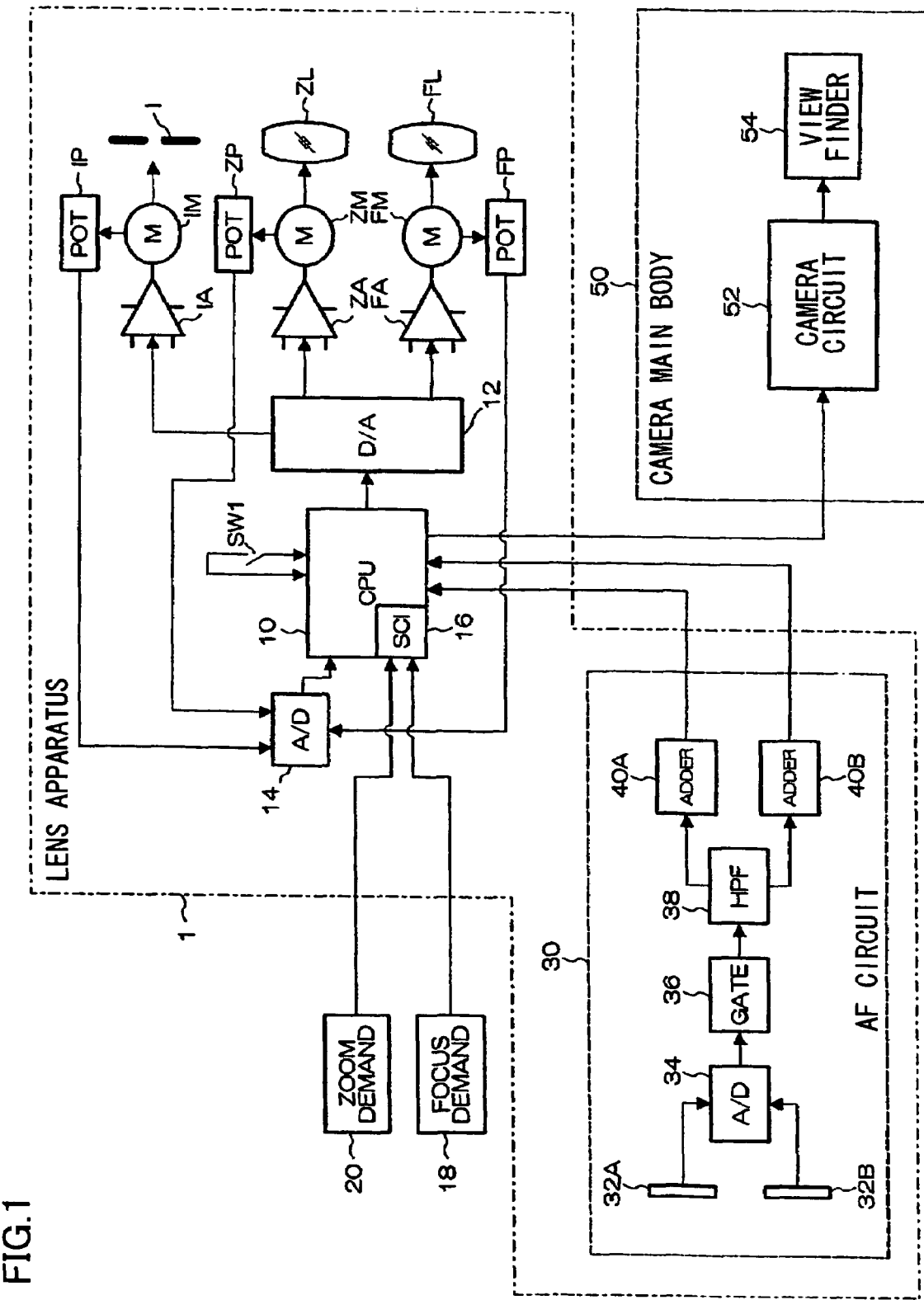
FIG. 1 is a block diagram showing a configuration of a lens system to which the present invention is applied.

FIG. 1 is a block diagram showing a configuration of a lens system to which the present invention is applied. The lens system shown in FIG. 1 is composed of a photographing lens (optical system) mounted by use of a mount on a camera main body 50 (camera head) of, for instance, a broadcasting television camera, and a control system that controls the photographing lens. In addition, the lens system shown in FIG. 1 is configured as the lens apparatus 1 in which a photographing lens and numerous components of a control system of the photographing lens are integrated. However, the apparatus configuring the lens system may take any configuration.

The photographing lens is a component related to an optical system that forms subject images, and is comprised of various optical components supported inside a lens barrel. In addition to various fixed lens groups, a focusing lens (group) FL and a zoom lens (group) ZL shown in FIG. 1 are also arranged inside the lens barrel as lens groups that are movable in the direction of the optical axis. Focus positions (subject distance) change in response to movement of the focusing lens FL, while image magnification (focal distance) changes in response to movement of the zoom lens ZL. Furthermore, a diaphragm I, shown in FIG. 1 and driven so as to open/close in order to modify image brightness, is arranged at the photographing lens.

The control system that controls the photographing lens is composed of a CPU 10, amplifiers FA, ZA, IA, motors FM, ZM, IM, potentiometers FP, ZP, IP, a focus demand 18, a zoom demand 20, an AF circuit 30 and the like. In addition, a camera circuit 52 mounted on the camera main body 50 on which the photographing lens is mounted also functions as a control system regarding control and the like of the diaphragm I of the photographing lens.

The CPU 10 supervises and controls the entire system. When a drive signal is outputted from the CPU 10 to each amplifier FA, ZA, IA via a D/A converter 12, each motor FM, ZM, IM is driven at a rotational speed corresponding to the value (voltage) of the drive signal. Each motor FM, ZM, IM is connected to the focusing lens FL, the zoom lens ZL and the diaphragm I of the photographing lens. The focusing lens FL, the zoom lens ZL and the diaphragm I are driven when the respective motors FM, ZM, IM are driven.

Connected to output shafts of the respective motors FM, ZM, IM are potentiometers FP, ZP, IP that output voltage signals corresponding to the respective rotational positions of the output shafts. A voltage signal from each potentiometer FP, ZP, IP is supplied to the CPU 10 via an A/D converter 14 as a signal indicating a position of the focusing lens FL, a position of the zoom lens ZL, and a position (aperture amount) of the diaphragm I. Therefore, the configuration is arranged so that the positions or operation speeds of the focusing lens FL, the zoom lens ZL and the diaphragm I are controlled to desired states by drive signals provided from the CPU 10 to each amplifier FA, ZA and IA.

In FIG. 1, the focus demand 18 and the zoom demand 20 are controllers provided with manually-operated members that specify, by use of manual operations, target positions or movement speeds of focusing (focusing lens FL) or zooming (zoom lens ZL) of the photographing lens. The focus demand 18 and the zoom demand 20 are connected via serial communication to the CPU 10 through a serial communication interface (SCI) 16.

In the lens system of the present embodiment, control of the focusing lens group FL (focusing control) is arranged so that manual focusing (MF) control and automatic focusing (AF) control may be switched by on/off operations of a switch SW1 that is operated by an operator. During MF control, focusing control is performed in accordance with focus instruction signals from the focus demand 18. When the manually-operated member of the focus demand 18 is operated during MF control, a focus instruction signal that specifies a focus target position corresponding to, for instance, the position of the manually-operated member is provided to the CPU 10. The CPU 10 controls the motor FM by use of a drive signal outputted to the amplifier FA so that the focus position assumes the target position specified by the focus instruction signal to control the position of the focusing lens FL. A description of AF control will be provided later.

Control of the zoom lens ZL (zoom control) is performed according to a zoom instruction signal provided by the zoom demand 20. When a manually-operated member of the zoom demand 20 is operated, a zoom instruction signal that specifies a target zoom movement speed corresponding to, for instance, the position of the manually-operated member, is provided to the CPU 10. The CPU 10 controls the motor ZM by use of a drive signal outputted to the amplifier ZA so that the zoom movement speed assumes the target movement speed specified by the zoom instruction signal to control the movement speed of the zoom lens ZL.

On the other hand, control of the diaphragm I (diaphragm control) is performed according to a diaphragm instruction signal provided by the camera circuit 52 of the camera main body 50. A diaphragm instruction signal that specifies a target position of the diaphragm I is outputted from a camera main body 50 to which the photographing lens of the present lens system is mounted by use of a mount, and provided to the CPU 10 via an A/D converter 14. A diaphragm instruction signal is a voltage signal that indicates a voltage value corresponding to, for instance, a target aperture value (F No.) as a target position (aperture amount) of the diaphragm I. The CPU 10 controls the position of the diaphragm I by driving the motor IM by use of a drive signal outputted to the amplifier IA so that the position of diaphragm I assumes a position corresponding to the target F No. specified by the diaphragm instruction signal provided by the camera circuit 50.

In FIG. 1, the AF circuit 30 is a circuit that detects a focus evaluation value indicating a contrast of an image (subject image), and is used during focusing control in a case in which AF control or MF control is executed when displaying focus information on the view finder 54 provided on the camera main body 50.

During AF control, based on information of a focus evaluation value obtained from the AF circuit 30, the CPU 10 controls the focusing lens FL by controlling the motor FM by use of a drive signal outputted to the amplifier FA so that the photographing lens assumes a correct focus state.

The AF circuit 30 comprises a pair of AF CCDs 32A and 32B, an A/D converter 34, a gate circuit 36, a highpass filter (HPF) 38, adder circuits 40A and 40B, and the like.

Figure 2:
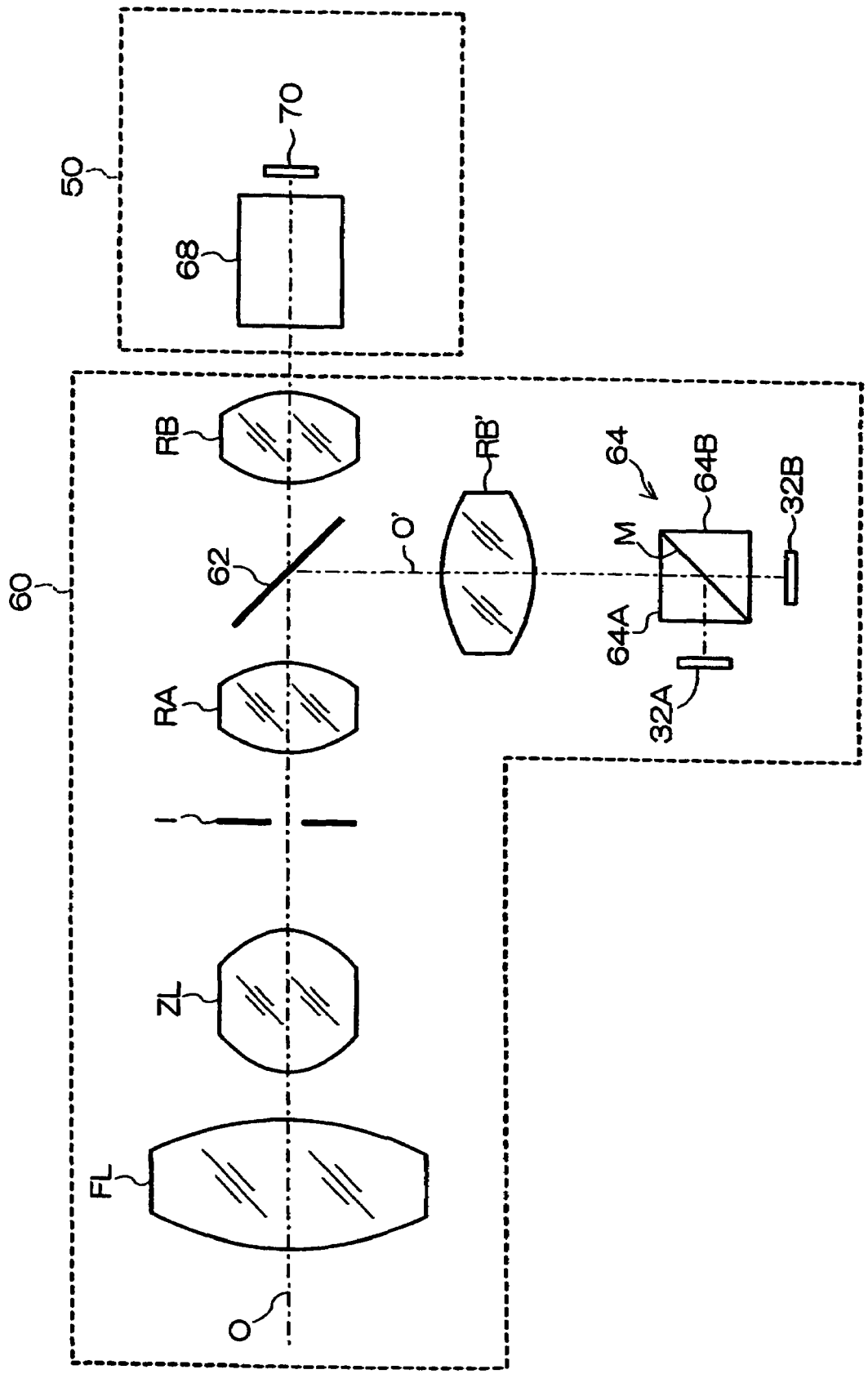
FIG. 2 is a block diagram showing a configuration of a photographing lens.

The pair of AF CCDs 32A and 32B are provided separately from the image capturing element (for instance, a CCD) mounted on the camera main body 50. While the CCD of the camera main body 50 is a CCD for photographing original visual images for recording or playback (hereinafter referred to as a "visual image CCD"), the AF CCDs 32A and 32B are CCDs provided for AF or focus information display, and are mounted on a photographing lens that is configured, for instance, as shown in FIG. 2.

An outline of the overall configuration of the photographing lens will now be given, together with a description of an arrangement of the AF CCDs 32A, 32B, with reference to FIG. 2. The above-described focusing lens (group) FL, the zoom lens (group) ZL, the diaphragm I, a relay lens (relay optical system) comprised of a front-side relay lens RA and a rear-side relay lens RB, or the like are sequentially arranged on an optical axis O of the photographing lens 60. Subject light incident to the photographing lens 60 passes through these lens groups and enters the camera main body 50. In the camera main body 50 are disposed: a color decomposition optical system 68 for decomposing subject light entering through the photographing lens 60 into three wavelengths of light corresponding to the three colors of red (R), green (G) and blue (B); and respective R, G and B visual image CCDs for capturing color-decomposed subject light images of these colors. In the present specification, one visual image CCD 70 represents the R, G and B visual image CCDs placed at positions defined by optical path lengths that are optically equivalent to one another, as shown in FIG. 2. Subject light incident to the image capturing surface of the visual image CCD 70 is photoelectrically converted by the same. A recording or playback visual image signal is produced by a predetermined signal processing circuit in the camera main body 50.

On the other hand, a half mirror 62 is placed between the front-side relay lens RA and the rear-side relay lens RB in the relay optical system of the photographing lens 60. The optical path of the photographing lens 60 is bisected by the half mirror 62. Among the subject light incident to the photographing lens 60, subject light transmitted through the half mirror 62 is guided to the camera main body 50 along the optical path of the optical axis O, as described above. Subject light reflected by the half mirror 62 is guided to an optical path (AF optical path) of an optical axis O' that is approximately perpendicular to the above-mentioned optical axis O. For instance, approximately 50% of the amount of the subject light incident to the half mirror 62 is transmitted through the half mirror 62. However, a half mirror having arbitrary transmission and reflectance ratios may be used as the half mirror 62.

A relay lens RB' that is similar to the above-mentioned rear-side relay lens RB, a light splitting optical system 64 comprised of two prisms 64A, 64B, and the above-mentioned AF CCDs 32A, 32B are disposed on the AF optical path. Subject light reflected by the half mirror 62 and guided to the AF optical path is transmitted through the relay lens RB', and enters the light splitting optical system 64. Subject light incident to the light splitting optical system is bisected into two subject lights with equal light intensity by a half mirror surface M at a portion at which the first prism 64A and the second prism 64B are jointed. Subject light reflected by the half mirror surface M is incident to an image capturing surface of one of the AF CCDs 32A, while subject light transmitted through the half mirror surface M is incident to an image capturing surface of the other AF CCD 32B.

Figure 3:
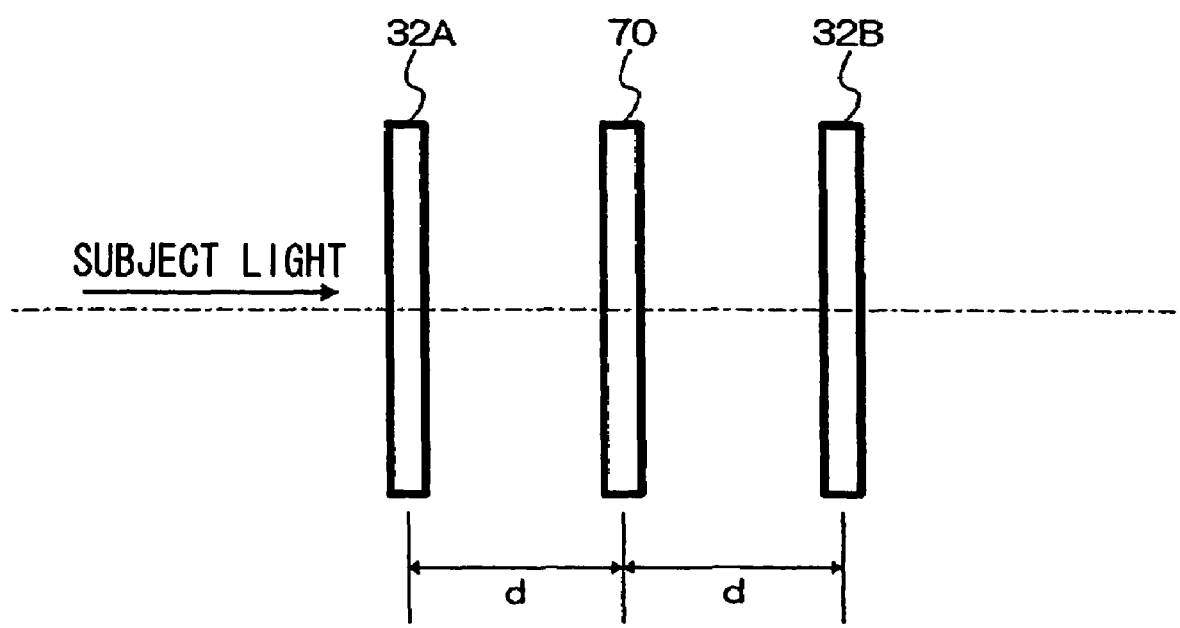
FIG. 3 is a diagram in which a visual image CCD and a pair of AF CCDs of the camera main body are shown on one optical axis.

FIG. 3 is a diagram in which a visual image CCD 70 and the AF CCDs 32A, 32B of the camera main body 50 are shown on the same optical axis. As shown in FIG. 3, the length of the optical path for subject light incident to the AF CCD 32A is set shorter than that of the optical path for subject light incident to the other AF CCD 32B, and the length of the optical path for subject light incident to the image capturing surface of the visual image CCD 70 is set to an intermediate length between the lengths of the optical paths to the AF CCDs 32A and 32B. In other words, (image capturing surfaces of) the pair of AF CCDs 32A, 32B are respectively positioned so as to be at an equal distance "d" to the front and rear of the image capturing surface of the visual image CCD 70.

The pair of AF CCDs 32A and 32B disposed in the photographing lens 60 as described above enables visual image signals to be obtained that are equivalent to those obtained in a case in which subject light incident to the photographing lens 60 are captured by image capturing surfaces respectively positioned at equal distances from the image capturing surface of the visual image CCD 70 on front and rear sides of the same. The AF CCDs 32A and 32B need not be CCDs for capturing multicolor images. In this embodiment, black and white visual image signals (luminance signals) are obtained from the AF CCDs 32A and 32B.

At the AF circuit 30 shown in FIG. 1, visual image signals obtained by each AF CCD 32A and 32B are converted into digital signals by the A/D converter 34, and then inputted to a gate circuit 36. Visual image signals within a range corresponding to a predetermined AF area (for instance, a rectangular area at the center of a screen) that is set inside a photographing range (screen) are extracted at the gate circuit 36. Extracted visual image signals within an AF area are then inputted to a highpass filter (HPF) 38 that extracts only high frequency component signals by the HPF 38.

Among high frequency component signals extracted by the HPF 38, those obtained from the AF CCD 32A are accumulated on a per-field basis by an adder circuit 40A, while those obtained from the AF CCD 32B are accumulated on a per-field basis by an adder circuit 40B. Accumulated values are outputted on a per-field basis from the AF circuit 30.

Accumulated values obtained from the respective adder circuits 40A and 40B in this manner respectively represent values that evaluate a contrast intensity of a subject image captured by the AF CCDs 32A and 32B. In the present specification, this accumulated value shall be referred to as a focus evaluation value. In addition, a focus evaluation value obtained from a visual image signal of the AF CDD 32A shall be referred to as a "chA focus evaluation value", while a focus evaluation value obtained from a visual image signal of the AF CDD 32B shall be referred to as a "chB focus evaluation value".

Figure 4:
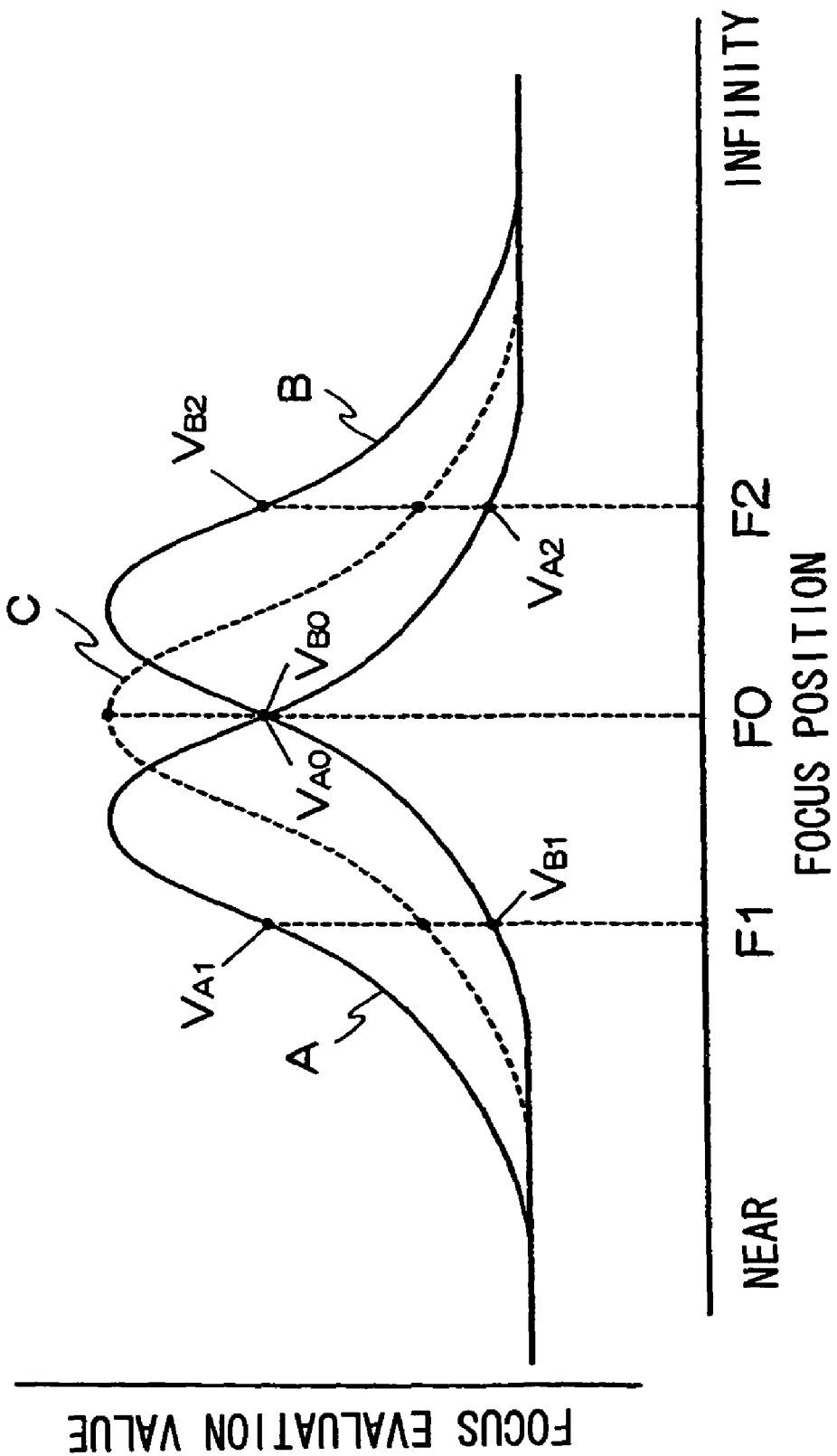
FIG. 4 is a diagram for describing the difference between the optical path lengths to the AF CCDs.

The CPU 10 detects a focus state of the photographing lens 60 with respect to the visual image CCD 70 based on chA and chB focus evaluation values obtained as described above. The principle of focus state detection is as described below. FIG. 4 is a graph in which an abscissa represents the position of the focusing lens FL (focus position) of the photographing lens 60 and an ordinate represents the focus evaluation value, and which shows an example of a relationship between focus positions and focus evaluation values when a subject is photographed. Curves A, B shown as solid lines in FIG. 4 respectively indicate with respect to the focus position chA and chB focus evaluation values respectively obtained from the AF CCDs 32A and 32B. On the other hand, a curve C shown as a broken line in FIG. 4 indicates with respect to the focus position the focus evaluation value assumed to be obtained from the visual image signal obtained from the visual image CCD 70.

Referring to FIG. 4, a focus state of a correct focus is achieved when the focus is set at a focus position F0 at which the focus evaluation value from the visual image CCD 70 indicated by the curve C is maximized. In a case in which the focus of the photographing lens 60 is set to a focus position F1 that is on a near-side of the focus position F0, the chA focus evaluation value will assume a value $V_{A1}$ of the curve A corresponding to the focus position F1, while the chB focus evaluation value will assume a value $V_{B1}$ of the curve B corresponding to the focus position F1. In this case, as can be understood from the graph, the chA focus evaluation value $V_{A1}$ is greater than the chB focus evaluation value $V_{B1}$. From this result, it may be understood that when the chA focus evaluation value $V_{A1}$ is greater than the chB focus evaluation value $V_{B1}$, the focus is set on the near-side of the correct focus position F0, i.e., at a front focus position.

On the other hand, in a case in which the focus of the photographing lens 60 is set to a focus position F2 that is on an infinity-side of the focus position F0, the chA focus evaluation value will assume a value $V_{A2}$ of the curve A corresponding to the focus position F2, while the chB focus evaluation value will assume a value $V_{B2}$ of the curve B corresponding to the focus position F2. In this case, the chA focus evaluation value $V_{A2}$ is smaller than the chB focus evaluation value $V_{B2}$. From this result, it may be understood that when the chA focus evaluation value $V_{A2}$ is smaller than the chB focus evaluation value $V_{B2}$, the focus is set on the infinity-side of the correct focus position F0, i.e., at a rear focus position.

In comparison, in a case in which the focus of the photographing lens 60 is set to the focus position F0, i.e., at the correct focus position, the chA focus evaluation value will assume a value $V_{A0}$ of the curve A corresponding to the focus position F0, while the chB focus evaluation value will assume a value $V_{B0}$ of the curve B corresponding to the focus position F0. In this case, the chA focus evaluation value $V_{A0}$ will equal the chB focus evaluation value $V_{B0}$. From this result, it may be understood that when the chA focus evaluation value $V_{A0}$ and the chB focus evaluation value $V_{B0}$ are equal to one another, the focus is set at the correct-focus position F0, or in other words, a correctly focused state is achieved.

As seen, the chA and chB focus evaluation values enable detection of whether the current focus state of the photographing lens with respect to the visual image CCD 70 is in any one of the states of front focus, rear focus or correct focus.

During AF control, the CPU 10 shown in FIG. 1 controls the focusing lens FL so as to achieve a correct focus state by sequentially detecting focus states of the photographing lens 60 with respect to the visual image CCD 70, based on chA and chB focus evaluation values as described above. For instance, in a case in which the focus state is at front focus, the focusing lens FL is moved in an infinity direction, and in a case in which the focus state is at rear focus, the focusing lens FL is moved in an near direction. In addition, when the focus state is at correct focus, the control section 30 stops the focusing lens FL. In this manner, the focusing lens FL is moved to and stopped at a position at which the focus state of the photographing lens is at correct focus. An AF method in which focusing is automatically performed using a plurality of AF CCDs having different optical path lengths, as described above, is referred to as an optical path length difference method.

The CPU 10 may be arranged to detect not only focus states, but also degrees of focus deviation from a difference or ratio of the chA and chB focus evaluation values, and reflect a detected focus deviation on the speed at which the CPU 10 moves the focusing lens FL.

Figure 5:
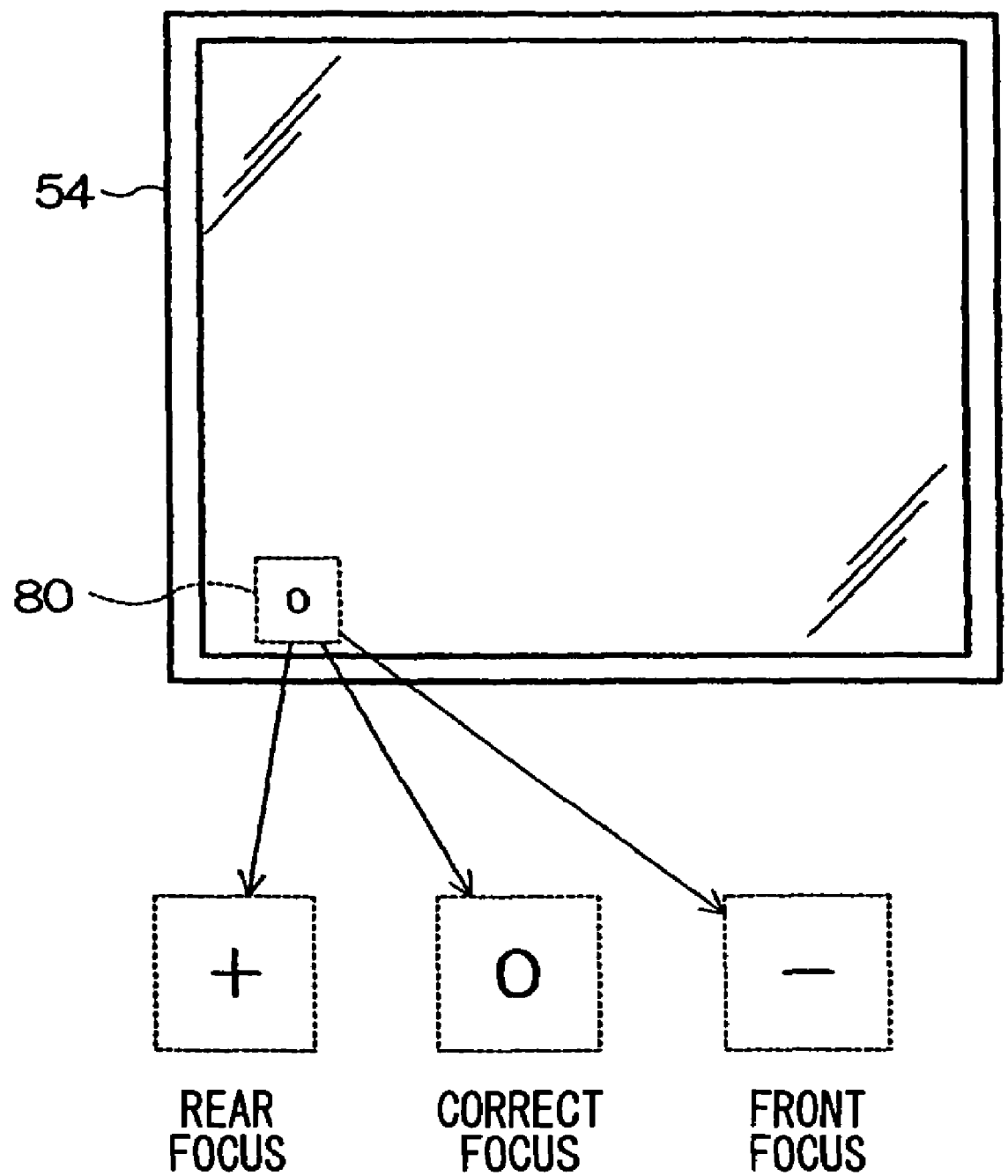
FIG. 5 is a diagram showing a focus information display section that displays focus information on a screen of a view finder.

The above-described lens system is arranged to display, during MF control, focus information representing a current focus state of the photographing lens on a view finder 54, shown in FIG. 1 and installed on the camera main body 50, in order to assist focusing to be performed under MF by a user. Focus information display is arranged so that, for instance, focus information is displayed superimposed on a photographed image at a certain area (focus information display section 80) on the screen of the view finder 54, as shown in FIG. 5. During correct focus, "0" is displayed as a correct focus display; during front focus, "−" is displayed as a front focus display; and during rear focus, "+" is displayed as a rear focus display.

The CPU 10 transmits focus state information indicating a current focus state to the camera circuit 52 of the camera main body 50. In accordance with the focus state information, the camera circuit 52 displays focus information indicating a current focus state by displaying any one of "0", "−" or "+" on the focus information display section, as described above.

Specific contents of the processing performed by the CPU 10 with respect to focus information display will now be described. During MF control, the CPU 10 obtains chA and chB focus evaluation values in the same manner as during AF control from the AF circuit 30, and detects (determines) a current focus state based on the chA and chB focus evaluation values. The CPU 10 then causes focus information to be displayed at the focus information display section of the view finder 54 by transmitting the focus state as focus state information to the camera circuit 52 of the camera main body 50, as described above.

It should be understood that contents of focus state detection processing for detecting a focus state for focusing during AF control need not be equivalent to contents of focus state detection processing for detecting a focus state for focus information display during MF control. The focus state detection processing during MF control according to the present embodiment differs from the focus state detection processing for focusing during AF control. However, focusing may also be performed during AF control by performing focus state detection processing that is equivalent to the focus state detection processing performed during MF control as described below. In addition, it is also possible to perform focus information display during AF control. As for focus states detected for focus information display in this case, either results of focus state detection processing performed for focusing may be used, or focus states detected during focus state detection processing performed to display focus information during MF control may be used.

Figure 6:
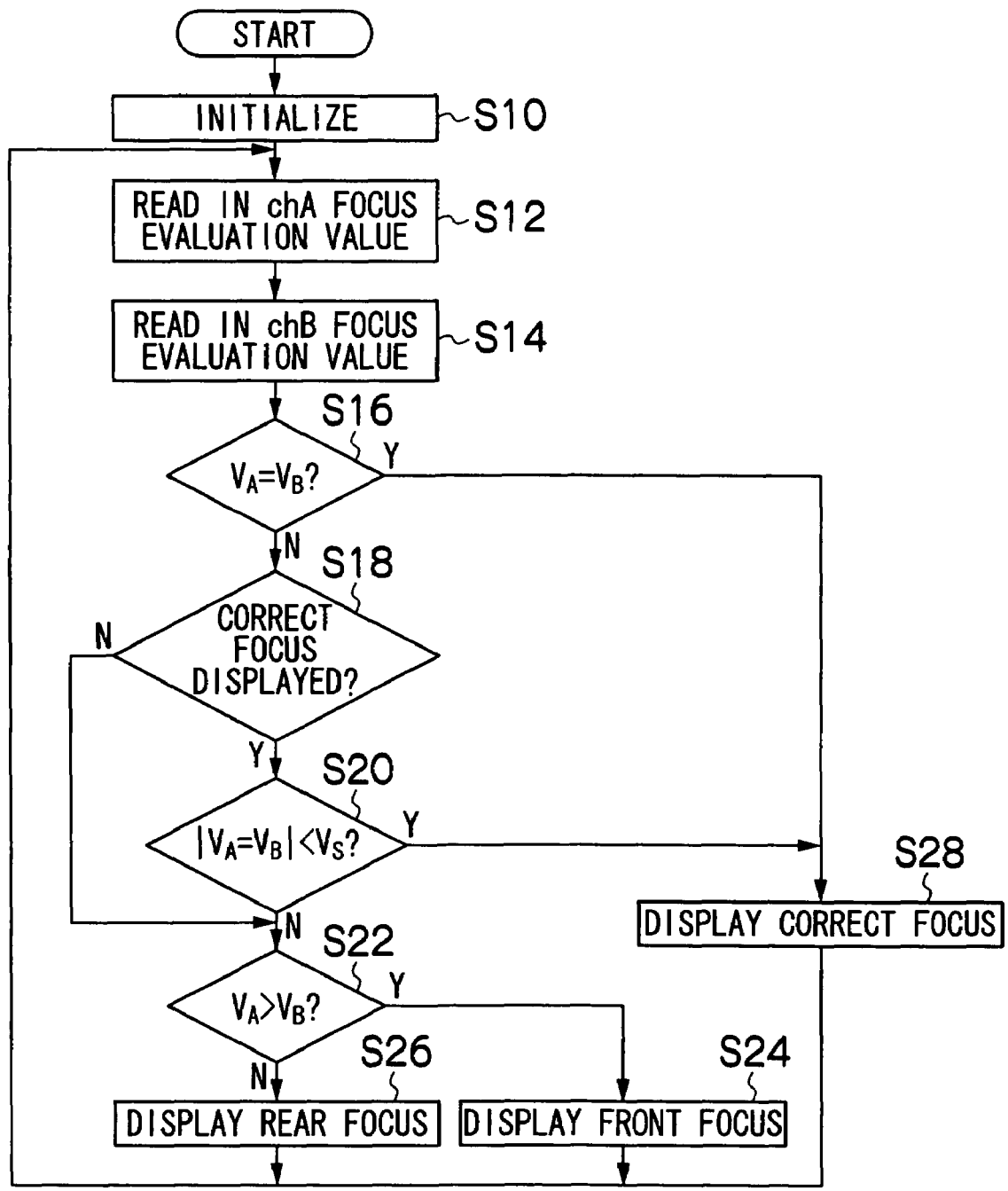
FIG. 6 is a flowchart showing a first embodiment of focus information display processing.

Firstly, a first embodiment of focus state detection processing for displaying focus information (focus information display processing) performed by CPU 10 will be described with reference to the flowchart shown in FIG. 6. After performing necessary initialization (step S10), the CPU 10 obtains a chA focus evaluation value $V_A$ and a chB focus evaluation value $V_B$ from the AF circuit 30 (step S12, S14). Then, the CPU 10 compares the focus evaluation values to judge whether the chA focus evaluation value $V_A$ is equal to the chB focus evaluation value $V_B$, or in other words, whether $V_A=V_B$ is true (step S16).

When "YES" is judged in step S16, the CPU 10 determines that the current focus state is a correct focus state, and arranges a "0" to be displayed at the focus information display section 80 of the view finder 54 in order to perform correct focus display indicating that the current focus state is a correct focus state (step S18). The routine then returns to the processing of step S12.

On the other hand, when "NO" is judged in step S16, the CPU 10 judges whether the current display at the focus information display section 80 is a correct focus display (step S18). When "NO" is judged, the routine proceeds to step S22. When "YES" is judged, the CPU 10 next judges whether the magnitude (absolute value) of the difference between the chA focus evaluation value $V_A$ and the chB focus evaluation value $V_B$ is smaller than a predetermined threshold, or in other words, whether $|V_A-V_B|<V_S$ (where $V_S$ is a predetermined threshold) is true (step S20). At this point, in the event that the chA focus evaluation value $V_A$ is equal to the chB focus evaluation value $V_B$ and a correct focus state is judged, when at least one of the chA focus evaluation value $V_A$ or the chB focus evaluation value $V_B$ subsequently changes due to noise or the like even though subject conditions (subject position and the like) or photographing lens conditions (position of the focusing lens FL, position of the zoom lens ZL, position of the diaphragm I or the like) are unchanged, a difference arises between the chA focus evaluation value $V_A$ and the chB focus evaluation value $V_B$. In such a case, the threshold $V_S$ is set to a value so that $|V_A-V_B|<V_S$ is true.

When "YES" is judged in step S20, the CPU 10 then performs correct focus display by arranging a "0" to be displayed at the focus information display section 80 (step S18). The routine then returns to step S12.

When "NO" is judged in either step S20 or step S18, the CPU 10 judges whether the chA focus evaluation value $V_A$ is greater than the chB focus evaluation value $V_B$, or in other words, whether $V_A>V_B$ is true (step S22). When "YES" is judged, the CPU 10 judges the current focus state to be a front focus state, and performs front focus display indicating that the current focus state is a front focus state by arranging a "−" to be displayed at the focus information display section 80 (step S24). When "NO" is judged, the CPU 10 judges the current focus state to be a rear focus state, and performs rear focus display indicating that the current focus state is a rear focus state by arranging a "+" to be displayed at the focus information display section 80 (step S26). Once the processing of either step S24 or step S26 is completed, the routine returns to step S12.

According to the above-described processing, in the event that a correct focus display is not performed, or in other words, an out-of-focus display (front focus display or rear focus display) is performed, a determination of a correct focus state is made and a correct focus display is performed when the chA and chB focus evaluation values are equal to one another. Once a determination of a correct focus state is made and a correct focus display is performed, an out-of-focus state is determined not at the instant a discrepancy occurs between the chA and chB focus evaluation values, but when a certain difference exists between the chA and chB focus evaluation values, thereby canceling the correct focus display. Therefore, when an operator manually performs focusing during MF control by referring to the focus information display at the focus information display section 80 and changes the focus state setting of the photographing lens from an out-of-focus state to a correct focus state, the operator may set the photographing lens to a correct focus state with a high focusing accuracy by moving the focus to a position at which a correct focus display is performed at the focus information display section 80. On the other hand, once a correct focus display is performed, a determination of an out-of-focus state is unlikely to be made even when focus evaluation values change due to noise or the like, and a stable state of correct focus display may be realized. However, when it is highly likely that a correct focus state has been disabled due to changes in subject conditions (subject position and the like) or the position of the focusing lens FL and the like, the condition of $|V_A-V_B|<V_S$ will no longer be true and the correct focus display will be cancelled.

In step S16, which is provided for judging whether a correct focus state exists, the CPU 10 may be arranged to judge a correct focus state not when the chA focus evaluation value $V_A$ is completely equal to the chB focus evaluation value $V_B$, but when the absolute value of a difference between the chA focus evaluation value $V_A$ and the chB focus evaluation value $V_B$ is smaller than a predetermined threshold. However, the threshold used in this case is to be smaller than the threshold $V_S$ used in the above-described step S20.

Additionally, in step S20 in which a determination of whether a correct focus display should be successively performed in the event that a correct focus state has already been determined and a correct focus display is being performed, correct focus display may be arranged to be successively performed in the event that either one of or both a variation of the chA focus evaluation value $V_A$ and a variation of the chB focus evaluation value $V_B$ is smaller than a predetermined threshold. However, in the event that the condition of step S16 is met even though this condition is not met, correct focus display will be arranged to be successively performed.

Figure 7:
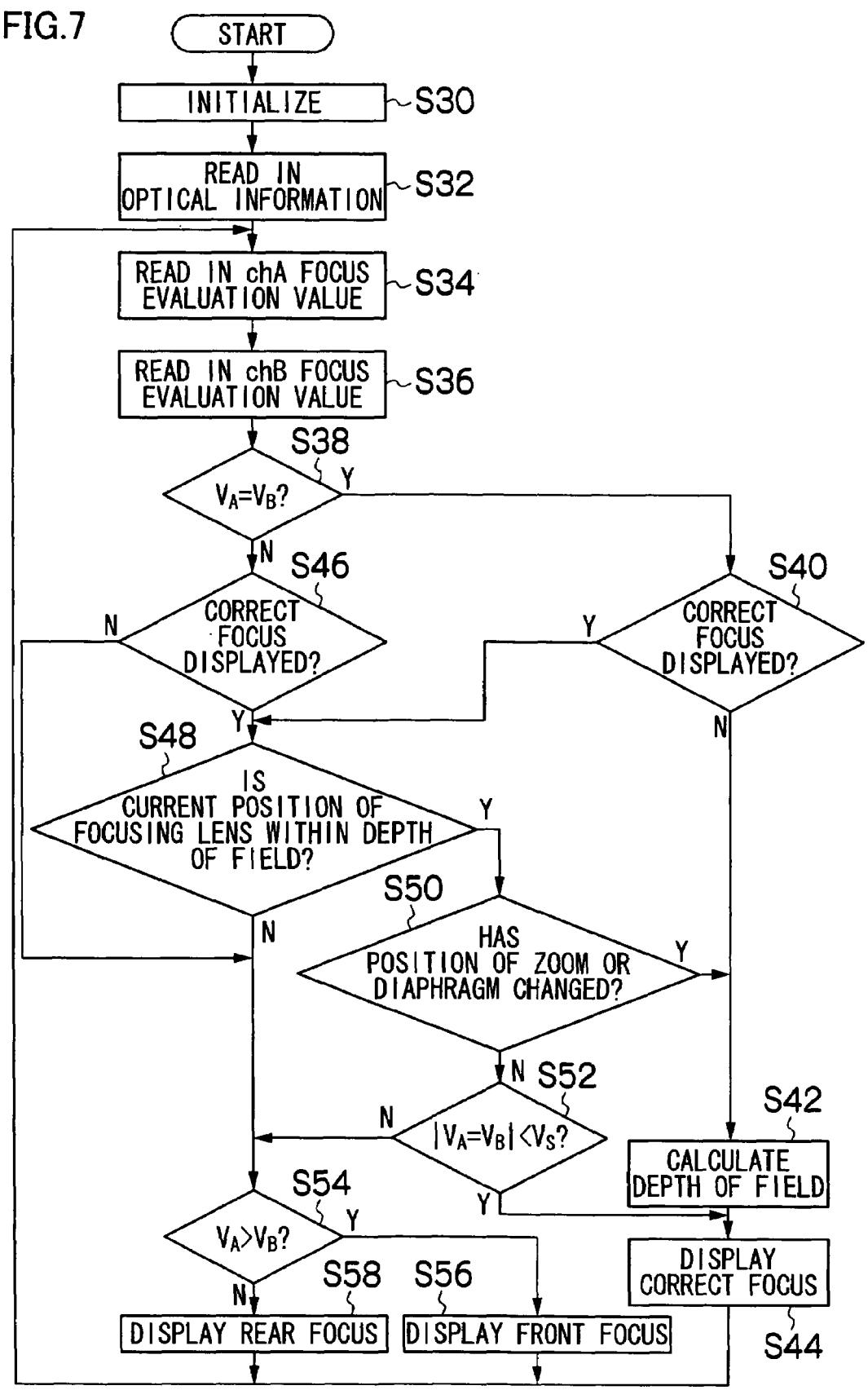
FIG. 7 is a flowchart showing a second embodiment of focus information display processing.

Next, a second embodiment of focus state detection processing for displaying focus information (focus information display processing) performed by CPU 10 will be described with reference to the flowchart shown in FIG. 7. After performing necessary initialization (step S30), the CPU 10 reads in necessary optical information (step S32). Optical information is information necessary for obtaining a depth of field at a position of the focusing lens FL at which a correct focus state is achieved. More specifically, current positions of the focusing lens FL, the zoom lens ZL and the diaphragm I are respectively read in from the potentiometers FP, ZP and IP.

The CPU 10 then obtains a chA focus evaluation value $V_A$ and a chB focus evaluation value $V_B$ from the AF circuit 30 (step S34, S36). The CPU 10 compares the focus evaluation values to judge whether the chA focus evaluation value $V_A$ is equal to the chB focus evaluation value $V_B$, or in other words, whether $V_A = V_B$ is true (step S38).

When "YES" is judged in step S38, the CPU 10 determines that the current focus state is a correct focus state, and next judges whether the current display at the focus information display section 80 of the view finder 54 is a correct focus display (step S40). When "NO" is judged, the CPU 10 next calculates a depth of field based on optical information obtained in step S32 (step S42), and arranges a "0" to be displayed in the focus information display section 80 in order to perform correct focus display indicating that the current focus state is a correct focus state (step S44). The routine then returns to step S34.

As well known, a depth of field is a range of subject distances in which the focus may be assumed to be at correct focus. If "f" is a focal distance of the photographing lens obtained from the optical information read-in in step S32, "FNO" is an aperture value, "L" is a subject distance based on the position of the focusing lens, and δ is a diameter of a predetermined allowable circle of confusion, a rear depth of field "Lγ" and a front depth of field "Lf" may respectively be obtained by the formulas (1) and (2) provided below.

$$L\gamma = (\delta \cdot FNO \cdot L^2)/(f^2 - \delta \cdot FNO \cdot L) \quad (1)$$

$$Lf = (\delta \cdot FNO \cdot L^2)/(f^2 + \delta \cdot FNO \cdot L) \quad (2)$$

When "NO" is judged in the above-mentioned step S38, the CPU 10 judges whether the current display at the focus information display section 80 is a correct focus display (step S46). In the event that "NO" is determined in step S46, the routine proceeds to step S54.

On the other hand, when either "YES" is determined in step S46 or "YES" is determined in the above-described step S40, or in other words, when the current display at the focus information display section 80 is a correct focus display, the CPU 10 next judges in step S42 whether the subject distance corresponding to the current position of the focusing lens FL is within the range of a newest depth of field calculated in step S42 (step S48).

When "YES" is judged in step S48, the CPU 10 next judges whether a change has occurred in one of the position of the zoom lens ZL or the position of the diaphragm I (step S50). When "NO" is judged, the CPU 10 next judges whether the magnitude (absolute value) of the difference between the chA focus evaluation value $V_A$ and the chB focus evaluation value $V_B$ is smaller than a predetermined threshold, or in other words, whether $|V_A - V_B| < V_S$ (where $V_S$ is a predetermined threshold) is true (step S52). Here, the threshold $V_S$ is set to a value with intentions similar to the threshold $V_S$ used in step S20 in the first embodiment. In other words, when it is highly likely that a correct focus state has been disabled due to changes in subject conditions (subject position and the like) or the position of the focusing lens FL and the like, "NO" will be determined in step S52 even though the current position of the focusing lens FL is within the depth of field and no changes have occurred in the focal distance or the aperture value of the photographing lens.

When "YES" is judged in step S52, the CPU 10 then performs correct focus display by arranging a "0" to be successively displayed in the focus information display section 80 (step S44). The routine then returns to step S34. In the event that "NO" is determined in step S52, the routine proceeds to step S54.

When "YES" is judged in step S50, the routine proceeds to step S42 to recalculate a depth of field (step S42). When calculating the depth of field, for the subject distance "L", a value of the same when the current correct focus display was first performed is used. For the focal distance and the aperture value, values corresponding to the current positions of the zoom lens ZL and the diaphragm I are used. In other words, since the depth of field changes when one of the focal distance or the aperture value of the photographing lens changes, a depth of field is recalculated using the current conditions for focal distance and aperture value. The CPU 10 then performs correct focus display by arranging a "0" to be displayed at the focus information display section 80 (step S44), and the routine then returns to step S34.

When "NO" is judged in any one of step S46, step S48 or step S52, the CPU 10 judges whether the chA focus evaluation value $V_A$ is greater than the chB focus evaluation value $V_B$, or in other words, whether $V_A > V_B$ is true (step S54). When "YES" is judged, the CPU 10 judges the current focus state to be a front focus state, and performs front focus display indicating that the current focus state is a front focus state by arranging a "–" to be displayed at the focus information display section 80 (step S56). When "NO" is judged, the CPU 10 judges the current focus state to be a rear focus state, and performs rear focus display indicating that the current focus state is a rear focus state by arranging a "+" to be displayed at the focus information display section 80 (step S58). Once the processing of either step S56 or step S58 is completed, the routine returns to step S34.

According to the above-described processing, a correct focus display is performed when the chA and chB focus evaluation values are equal to one another and a determination of a correct focus state is made. However, once a determination of a correct focus state is made and a correct focus display is performed, an out-of-focus state is determined not at the instant a discrepancy occurs between the chA and chB focus evaluation values, but when the chA and chB focus evaluation values deviate from a depth of field range when the position of the focusing lens FL is determined to be at a correct focus state, thereby canceling the correct focus display. Therefore, when an operator manually changes the setting of the photographing lens from an out-of-focus state to a correct focus state during MF control by referring to the focus information at the focus information display section 80, the operator may set the photographing lens to a correct focus state with a high focusing accuracy by moving the focus to a position at which a correct focus display is performed at the focus information display section 80. On the other hand, once a correct focus display is performed, a determination of an out-of-focus state will not be performed until the position of the focusing lens FL falls out from the depth of field range, and a stable state of correct focus display may be achieved. However, when it is highly likely that a correct focus state has been disabled due to changes in subject conditions (subject position and the like) or the like even though the position of the focusing lens FL is within the depth of field range, the condition of $|V_A - V_B| < V_S$ will no longer be true and the correct focus display will be cancelled. In addition, since the depth of field will be recalculated when a change occurs in the focal distance or the aperture value of the photographing lens, a depth of field range in which a correct focus state is determined will be appropriately configured.

In step S38, which is provided for judging whether a correct focus state exists, the CPU 10 may be arranged to judge a correct focus state not when the chA focus evaluation value $V_A$ is completely equal to the chB focus evaluation value $V_B$, but when the absolute value of a difference between the chA focus evaluation value $V_A$ and the chB focus evaluation value $V_B$ is smaller than a predetermined threshold. However, the threshold used in this case is to be smaller than the threshold $V_S$ used in the above-described step S52.

In addition, step S52 may be arranged so that correct focus display is successively performed when "Yes" is judged in the event that either one of or both a variation of the chA focus evaluation value $V_A$ and a variation of the chB focus evaluation value $V_B$ is smaller than a predetermined threshold. However, in the event that the condition of step S38 is met even though this condition is not met, correct focus display will be arranged to be successively performed.

Next, a third embodiment of focus state detection processing for displaying focus information (focus information display processing), performed by CPU 10, will be described. The present embodiment is configured so that two modes are selectable in regards to focus information display. One of the modes is a mode (referred to as a "depth mode") in which a state of correct focus display is cancelled based on whether the focusing lens position is within a depth of field in the event that the focus information display section 80 is in a state of correct focus display, as in the second embodiment. The other mode is a mode (non-depth mode) in which, regardless of the depth of field, the focus information display section 80 enters a state of correct focus display when the chA and chB focus evaluation values match one another, and the state of correct focus display is cancelled when the chA and chB focus evaluation values deviate from one another. These modes are arranged to be switched over by the operator by operating a predetermined mode switch (not shown), and the CPU 10 displays focus information corresponding to the selected mode by detecting the state of the mode switch. According to the present configuration, for instance, when performing tracking adjustment of the photographing lens (tracking adjustment with respect to the visual image CCD 70 or the AF CCDs 32A, 32B), in the event that it is desirable to perform correct focus display at a high focusing accuracy not only when an out-of-focus display is performed but also when a correct focus display is performed, such correct focus display at a high focusing accuracy may be achieved by switching to the non-depth mode.

In addition, the present embodiment is arranged so that focus information display is performed at a plurality of focus information display sections. For instance, it is assumed that, in addition to the focus information display section 80 provided on the screen of the view finder 54 in the same manner as the embodiment described earlier, a focus information display section that displays focus information is also provided on the focus demand 18. However, a plurality of focus information display sections may be provided at other sections.

Figure 8:
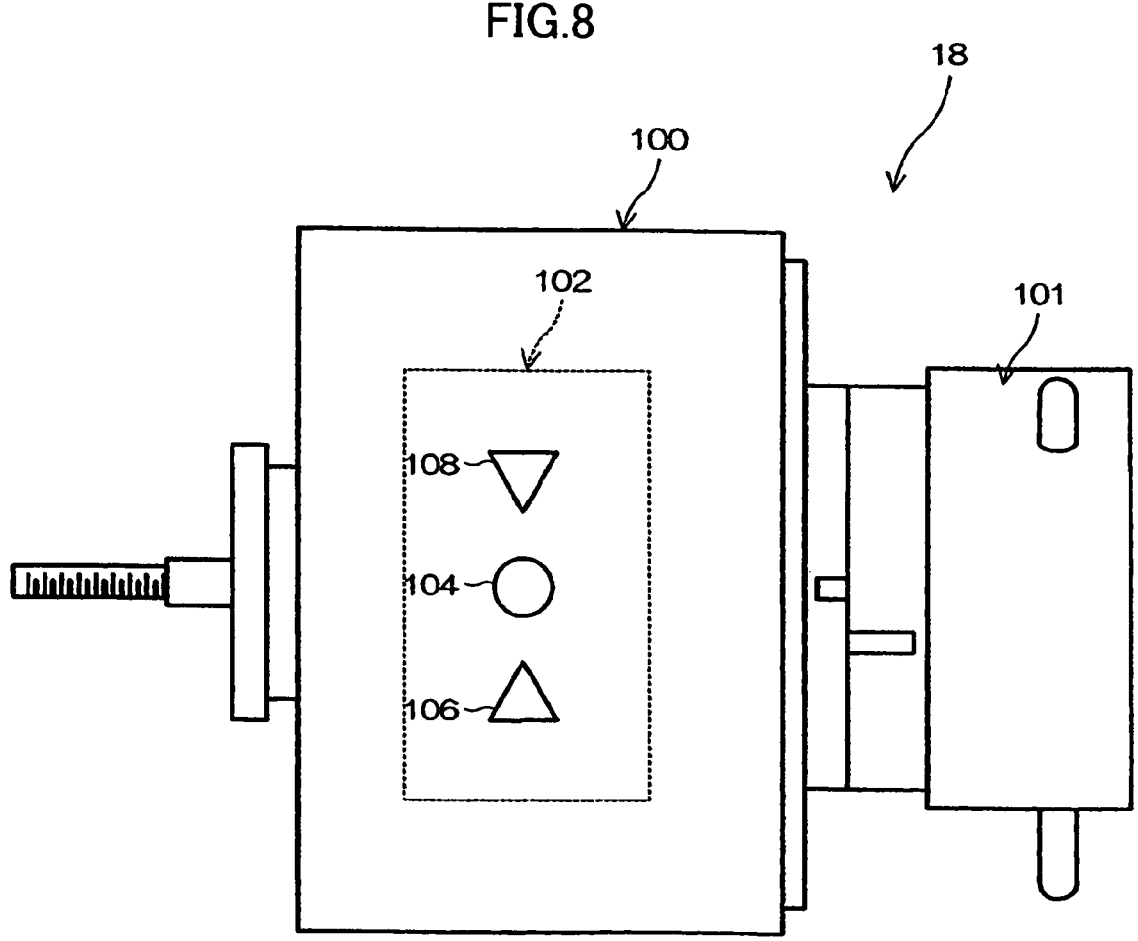
FIG. 8 is a front view depicting an exterior of a focus demand at which a focus information display section is provided.

FIG. 8 is a front view depicting an exterior of a focus demand 18 at which a focus information display section is provided. In FIG. 8, the focus demand 18 comprises: a demand main body 100 housing various circuit components and the like of the focus demand 18; and a manual operating member (focus knob 101) rotatably supported with respect to the demand main body 100. A focus information display section 102 is provided on the demand main body 100. As shown in FIG. 8, the focus information display section 102 is composed of three lamps 104, 106 and 108. A lamp 104, positioned at center and having a circular light output face, is a lamp that is turned on during a correct focus state and is turned off during an out-of-focus state. A lower lamp 106, having a triangular light output face, is a lamp that is turned on during a front focus state and is turned off when not in a front focus state. An upper lamp 108, also having a triangular light output face, is a lamp that is turned on during a rear focus state and is turned off when not in a rear focus state.

The focus demand 18 is equipped with a CPU. The CPU 10 of the lens apparatus 1 transmits focus state information, which is transmitted to the camera main body 50, to the CPU of the focus demand 18 as well. The CPU of the focus demand 18 controls on/off of the respective lamps 104 to 108 of the focus information display section 102 according to focus state information provided from the CPU 10 in order to display a current focus state at the focus information display section 102.

In addition, the focus information display section 102 provided on the focus demand 18 is also provided with a same mode switch (not shown), as described earlier, that switches between focus information display during a depth mode and focus information display during a non-depth mode, separately from the mode switch at the focus information display section 80 of the view finder 54.

Figure 9:
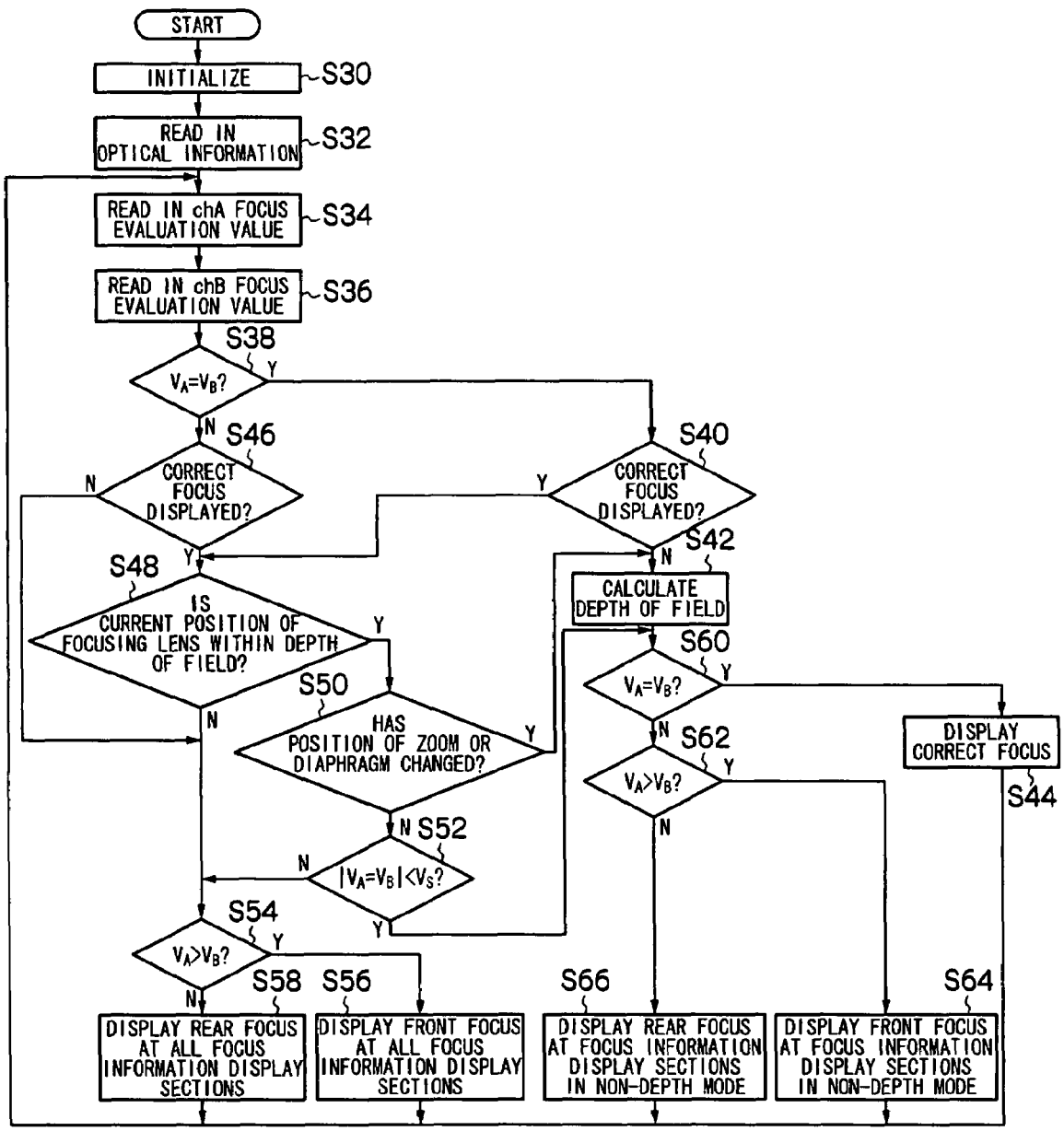
FIG. 9 is a flowchart showing a fourth embodiment of focus information display processing.

FIG. 9 is a flowchart showing a procedure of focus information display processing according to a fourth embodiment, in which focus information is displayed at a plurality of focus information display sections, and at the same time, switching may be performed between a depth mode and a non-depth mode as described above. Same or like processing steps as in the flowchart according to the second embodiment, shown in FIG. 7, are assigned same step numbers. Thus, for the present embodiment, processing steps that differ from FIG. 7 will be primarily described. After performing the calculation of a depth of field of step S42 shown in FIG. 9, the CPU 10 compares the chA focus evaluation value $V_A$ with the chB focus evaluation value $V_B$ to judge whether the chA focus evaluation value $V_A$ is equal to the chB focus evaluation value $V_B$, or in other words, whether $V_A = V_B$ is true (step S60). When "YES" is judged, regardless of whether the mode is the depth mode or the non-depth mode, the CPU 10 performs correct focus display at all focus information display sections (step S44). On the other hand, when "NO" is judged in step S60, the CPU 10 judges whether the chA focus evaluation value $V_A$ is greater than the chB focus evaluation value $V_B$, or in other words, whether $V_A > V_B$ is true (step S62). When "YES" is judged, the CPU 10 changes the focus information display section during non-depth mode to a front focus display (step S64). When "NO" is judged, the CPU 10 changes the focus information display section during non-depth mode to a rear focus display (step S66). As a result, the focus information display section during non-depth mode displays an out-of-focus state unless the chA focus evaluation value $V_A$ equals the chB focus evaluation value $V_B$. Meanwhile, a correct focus display is performed at the focus information display section during depth mode.

On the other hand, when "YES" is judged in the judgment performed in step S54 on whether the chA focus evaluation value $V_A$ is greater than the chB focus evaluation value $V_B$, or in other words, whether $V_A > V_B$ is true, the CPU 10 performs front focus display at all focus information display sections regardless of whether the mode is the depth mode or the non-depth mode (step S56). When "NO" is judged, the CPU 10 performs rear focus display at all focus information display sections (step S58). As a result, either front focus display or rear focus display will be equally performed at all focus information display sections until a correct focus state is determined and correct focus display is performed.

In steps S38 and S60, which are provided for judging whether a correct focus state exists in the same manner as the second embodiment, the CPU 10 may be arranged to judge a correct focus state not when the chA focus evaluation value $V_A$ is completely equal to the chB focus evaluation value $V_B$, but when the absolute value of a difference between the chA focus evaluation value $V_A$ and the chB focus evaluation value $V_B$ is smaller than a predetermined threshold. However, the threshold used in this case is to be smaller than the threshold $V_S$ used in the above-described step S52.

In addition, step S52 may be arranged so that correct focus display is successively performed when "Yes" is judged in the event that either one of or both a variation of the chA focus evaluation value $V_A$ and a variation of the chB focus evaluation value $V_B$ is smaller than a predetermined threshold. However, in the event that the condition of step S38 is met even though this condition is not met, correct focus display will be arranged to be successively performed.

As seen, while the above-described embodiments have been arranged so that either a front focus display or a rear focus display is performed in a case of a state that is not a correct focus state, an out-of-focus state may simply be displayed in a case of a state that is not a correct focus state instead of displaying a front focus state or a rear focus state.

In addition, the display mode of focus information indicating a focus state at the focus information display sections (80, 102) in the above-described embodiments is merely exemplary, and the focus information display sections may assume any mode as long as a correct focus state and an out-of-focus state may be identifiably displayed.

Furthermore, the above-described embodiments are arranged so that, by altering the determination of whether the state is a correct focus state when a correct focus display is being performed from the determination of whether the state is a correct focus state when an out-of-focus display (front focus display or rear focus display) is being performed, a focus position range at which a correct focus state is determined when a correct focus display is being performed is wider than a focus position range at which a correct focus state is determined when an out-of-focus display is being performed. Methods other than that described in the above-described embodiments may be used for such determinations of a correct focus state. Moreover, a configuration is possible in which: the method of determining whether the state is a correct focus state is not changed according to the display state; determination of whether the state is a correct focus state is made while an out-of-focus display is performed; a correct focus display is sustained for a certain period of time when a correct focus state is determined and a correct focus display is performed; after a lapse of a certain period of time, a determination of whether the state is a correct focus state is made, and based on the results thereof, the correct focus display is either continued or cancelled (out-of-focus display).

In addition, the parameters (for instance, the threshold $V_S$ that is compared to the magnitude of the difference between the chA and chB focus evaluation values, the diameter of the allowable circle of confusion used when obtaining a depth of field, the period of time for which a correct focus display is continued as described above when a correct focus state is determined and a correct focus display is performed, and the like) used in the above-described embodiments for determining whether the state is a correct focus state when either a correct focus display or an out-of-focus display is performed may be arranged to be modifiable or selectable by use of an external device such as a personal computer.

Furthermore, in the above-described embodiments, while a mode has been described in which focus evaluation values of two focus positions used for focus state detection are obtained by image capturing surfaces (AF CCDs 32A and 32B) disposed at positions with different optical path lengths, the present invention is not limited to this mode. For instance, in a case in which a particular image capturing element for detecting focus states, as used in the above-described embodiments, is not provided, focus states may be detected from visual image signals from the visual image CCD 70. In this case, if a wobbling lens that minutely fluctuates focus has been provided, the wobbling lens may be moved back and forth to obtain focus evaluation values at two or more focus positions, and a focus state may be detected based on the obtained focus evaluation values.

What is claimed is:

1. A focus information display system comprising:
    a focus state display device that displays whether a focus state of an optical system that forms an subject image is a correct focus state or an out-of-focus state;
    a first correct focus determination device that determines, in the event that an out-of-focus display indicating an out-of-focus state is performed by the focus state display device, whether a focus state of the optical system is a correct focus state or an out-of-focus state;
    a second correct focus determination device that determines, in the event that a correct focus display indicating a correct focus state is performed by the focus state display device, whether a focus state of the optical system is a correct focus state or an out-of-focus state, wherein a determination of a correct focus state is made in a focus position range that is wider than the focus position range in which the first correct focus determination device determines a correct focus state; and
    a display switching device that switches the focus state display device to a correct focus display when the first correct focus determination device determines a correct focus state in the event that an out-of-focus display is performed by the focus state display device, and switches the focus state display device to an out-of-focus display when the second correct focus determination device determines an out-of-focus state in the event that a correct focus display is performed by the focus state display device.

2. The focus information display system according to claim 1, further comprising
    a focus evaluation value detection device that detects a focus evaluation value indicating a contrast intensity of a subject image formed by the optical system, wherein
    the first correct focus determination device acquires focus evaluation values from at least two focus positions of the optical system via the focus evaluation value detection device, and determines a correct focus state when the magnitude of the difference between the two acquired focus evaluation values is below a predetermined threshold.

3. The focus information display system according to claim 2, wherein
    the focus evaluation value detection device detects focus evaluation values of at least two focus positions of the optical system by detecting focus evaluation values of a subject image captured by at least two image capturing surfaces positioned so that optical path lengths thereof differ from one another.

4. The focus information display system according to claim 2, wherein
    the second correct focus determination device acquires focus evaluation values of at least two focus positions of the optical system via the focus evaluation value detection device, and determines a correct focus state when the magnitude of the difference between the two acquired focus evaluation values is below a threshold having a greater value than the threshold used by the first correct focus determination device.

5. The focus information display system according to claim 3, wherein
the second correct focus determination device acquires focus evaluation values of at least two focus positions of the optical system via the focus evaluation value detection device, and determines a correct focus state when the magnitude of the difference between the two acquired focus evaluation values is below a threshold having a greater value than the threshold used by the first correct focus determination device.

6. The focus information display system according to claim 1, wherein
the second correct focus determination device further comprises a depth of field calculation device that calculates a depth of field at a focus position at which a correct focus state is determined by the first correct focus determination device, and a correct focus state is determined when the focus position of the optical system is within a depth of field range calculated by the depth of field calculation device.

7. The focus information display system according to claim 2, wherein
the second correct focus determination device further comprises a depth of field calculation device that calculates a depth of field at a focus position at which a correct focus state is determined by the first correct focus determination device, and a correct focus state is determined when the focus position of the optical system is within a depth of field range calculated by the depth of field calculation device.

8. The focus information display system according to claim 3, wherein
the second correct focus determination device further comprises a depth of field calculation device that calculates a depth of field at a focus position at which a correct focus state is determined by the first correct focus determination device, and a correct focus state is determined when the focus position of the optical system is within a depth of field range calculated by the depth of field calculation device.

9. The focus information display system according to claim 4, wherein
the second correct focus determination device further comprises a depth of field calculation device that calculates a depth of field at a focus position at which a correct focus state is determined by the first correct focus determination device, and a correct focus state is determined when the focus position of the optical system is within a depth of field range calculated by the depth of field calculation device.

10. The focus information display system according to claim 5, wherein
the second correct focus determination device further comprises a depth of field calculation device that calculates a depth of field at a focus position at which a correct focus state is determined by the first correct focus determination device, and a correct focus state is determined when the focus position of the optical system is within a depth of field range calculated by the depth of field calculation device.

11. The focus information display system according to claim 6, wherein
the second correct focus determination device acquires focus evaluation values of at least two focus positions of the optical system via the focus evaluation value detection device, and determines a correct focus state when the magnitude of the difference between the two acquired focus evaluation values is below a threshold having a greater value than the threshold used by the first correct focus determination device, and at the same time, the focus position of the optical system is within the depth of field range calculated by the depth of field calculation device.

12. The focus information display system according to claim 7, wherein
the second correct focus determination device acquires focus evaluation values of at least two focus positions of the optical system via the focus evaluation value detection device, and determines a correct focus state when the magnitude of the difference between the two acquired focus evaluation values is below a threshold having a greater value than the threshold used by the first correct focus determination device, and at the same time, the focus position of the optical system is within the depth of field range calculated by the depth of field calculation device.

13. The focus information display system according to claim 8, wherein
the second correct focus determination device acquires focus evaluation values of at least two focus positions of the optical system via the focus evaluation value detection device, and determines a correct focus state when the magnitude of the difference between the two acquired focus evaluation values is below a threshold having a greater value than the threshold used by the first correct focus determination device, and at the same time, the focus position of the optical system is within the depth of field range calculated by the depth of field calculation device.

14. The focus information display system according to claim 9, wherein
the second correct focus determination device acquires focus evaluation values of at least two focus positions of the optical system via the focus evaluation value detection device, and determines a correct focus state when the magnitude of the difference between the two acquired focus evaluation values is below a threshold having a greater value than the threshold used by the first correct focus determination device, and at the same time, the focus position of the optical system is within the depth of field range calculated by the depth of field calculation device.

15. The focus information display system according to claim 10, wherein
the second correct focus determination device acquires focus evaluation values of at least two focus positions of the optical system via the focus evaluation value detection device, and determines a correct focus state when the magnitude of the difference between the two acquired focus evaluation values is below a threshold having a greater value than the threshold used by the first correct focus determination device, and at the same time, the focus position of the optical system is within the depth of field range calculated by the depth of field calculation device.

16. The focus information display system according to claim 6, wherein
the depth of field calculation device re-calculates a depth of field in the event that at least one of a focal length or an aperture value of the optical system changes.

17. The focus information display system according to claim 11, wherein the depth of field calculation device re-calculates a depth of field in the event that at least one of a focal length or an aperture value of the optical system changes.

18. The focus information display system according to claim 1, further comprising a determination switching device that switches, based on an operation of a predetermined switch, the determination by the second correct focus determination device on whether the state is a correct focus state or an out-of-focus state to a determination that is similar to that performed by the first correct focus determination device.

* * * * *